United States Patent
Ruckle

(10) Patent No.: US 8,493,061 B2
(45) Date of Patent: Jul. 23, 2013

(54) CYCLE METER ADJUSTMENT DEVICE

(75) Inventor: Stephen James Ruckle, El Cajon, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 582 days.

(21) Appl. No.: 12/765,909

(22) Filed: Apr. 23, 2010

(65) Prior Publication Data

US 2011/0260712 A1     Oct. 27, 2011

(51) Int. Cl.
*G01P 3/48*     (2006.01)

(52) U.S. Cl.
USPC ......................................................... 324/166

(58) Field of Classification Search
USPC ......................................................... 324/166
See application file for complete search history.

(56) References Cited

U.S. PATENT DOCUMENTS

| | | |
|---|---|---|
| 3,177,645 A | 4/1965 | Devanney |
| 3,289,131 A | 11/1966 | Watkins et al. |
| 3,403,272 A | 9/1968 | Dold |
| 4,012,623 A | 3/1977 | Fleischer |
| 4,507,549 A | 3/1985 | Secord |
| 4,696,019 A | 9/1987 | Tulpule et al. |
| 4,727,263 A | 2/1988 | Sudler |
| 5,546,067 A | 8/1996 | Schmidt et al. |
| 7,328,122 B2 | 2/2008 | Courtney |
| 7,362,070 B2 | 4/2008 | Games et al. |

*Primary Examiner* — Bot Ledynh
(74) *Attorney, Agent, or Firm* — Carlson, Gaskey & Olds P.C.

(57) ABSTRACT

An example cycle meter adjusting device includes a circuit configured to provide voltage pulses and an adjustable potentiometer configured to vary the frequency of the voltage pulses provided by the circuit. A coupling interface is configured to selectively communicate the voltage pulses provided by the circuit to a cycle meter having a display. The voltage pulses adjust a number of cycles shown on the display. Another example cycle meter adjuster includes a circuit configured to provide voltage pulses. A controller is configured to selectively adjust a frequency of the voltage pulses. A connection interface is configured to communicate the voltage pulses to a cycle meter.

15 Claims, 5 Drawing Sheets

CYCLE METER ADJUSTMENT DEVICE

BACKGROUND

This disclosure relates generally to adjusting a cycle meter. More particularly, this disclosure relates to an adjustable cycle meter adjusting device.

Cycle meters are used in aircraft, generators, automobiles, etc. The cycle meters track and display cycles for various components. For example, some aircraft include an electro-mechanical cycle meter that tracks and displays the number of start and stop cycles on the aircraft engine. One cycle typically represents a start-run-stop-cooldown sequence of the engine. Adjusting the cycle meter is sometimes required. As an example, a new turbine wheel installed within the engine or other types of repairs may necessitate an adjustment of the cycle meter. Adjusting the cycle meter typically involves connecting the cycle meter to an adjustment device that advances the cycle meter forward several cycles until the cycle meter display shows "000000," to reflect that a new turbine wheel is installed.

SUMMARY

An example cycle meter adjusting device includes a circuit configured to provide a voltage pulse and an adjustable potentiometer configured to vary the frequency of the voltage pulse provided by the circuit. A coupling interface is configured to selectively communicate voltage pulses provided by the circuit to a cycle meter having a display. The voltage pulses adjust a number of cycles shown on the display.

Another example cycle meter adjuster includes a circuit configured to provide voltage pulses. A controller is configured to selectively adjust a frequency of the voltage pulses. A connection interface is configured to communicate the voltage pulses to a cycle meter.

An example method of adjusting a cycle meter includes communicating a plurality of first voltage pulses from an adjuster to a cycle meter. The plurality of first voltage pulses have a first frequency. The method further includes communicating a plurality of second voltages pulses from the adjuster to the cycle meter. The plurality of second voltage pulses have a second frequency different than the first frequency.

These and other features of the disclosed examples can be best understood from the following specification and drawings, the following of which is a brief description:

DETAILED DESCRIPTION

Figure 1:
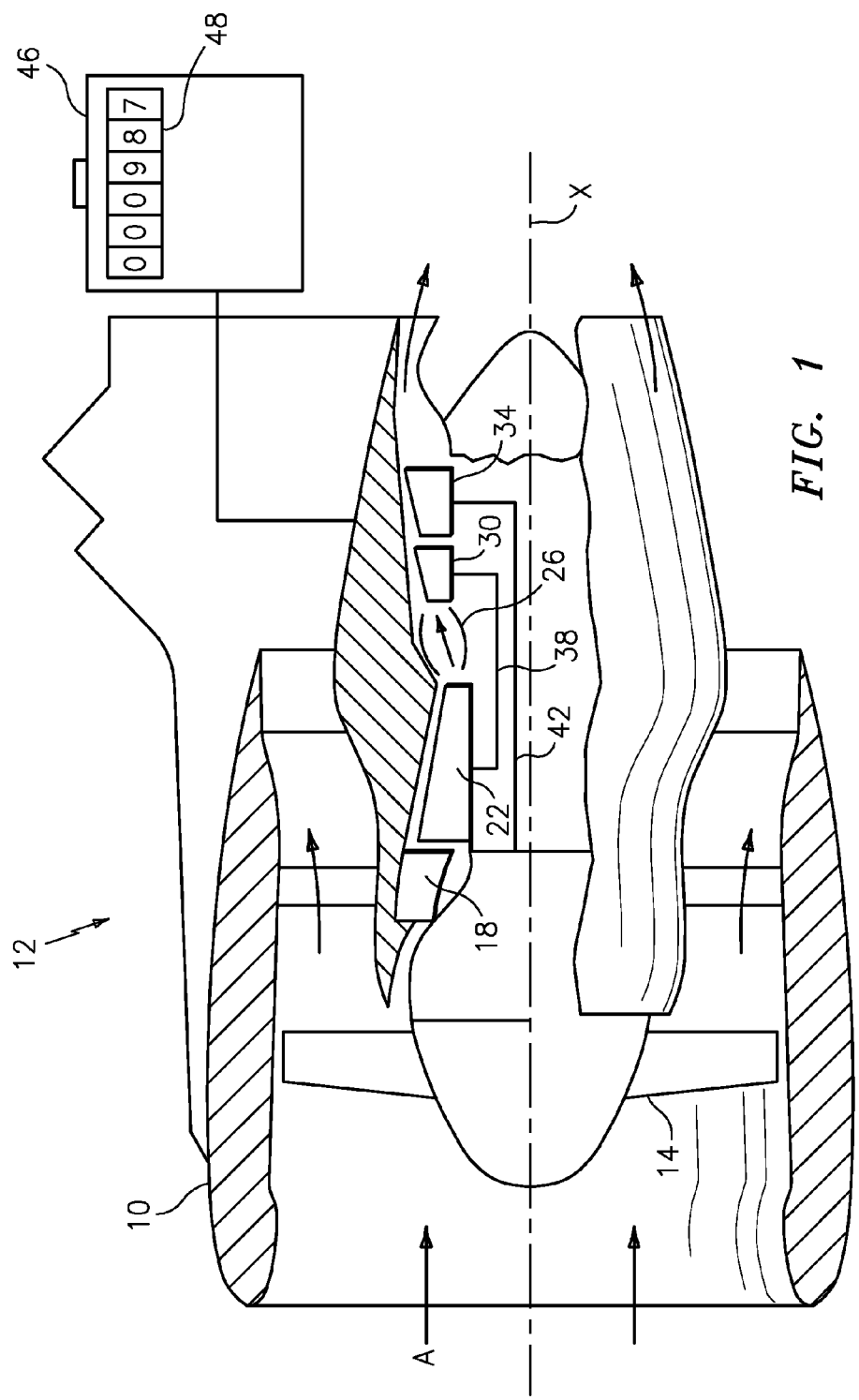
FIG. 1 shows a partial schematic view of an example gas turbine engine.

FIG. 1 schematically illustrates an example turbofan gas turbine engine 10 of an aircraft 12. The gas turbine engine 10 includes (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X.

During operation, air A is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expended to provide thrust.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42. The examples described in this disclosure are not limited to the two-spool engine architecture described, however. Other examples architectures include single-spools or three-spools.

The example engine 10, and specifically the low pressure turbine 34, communicates with a cycle meter 46. In this example, the cycle meter 46 shows "000987" cycles on a display 48 of the cycle meter 46. As can be appreciated, the number of cycles shown on the display 48 corresponds to the number of cycles on the low pressure turbine 34.

The cycle meter 46 is mounted to the aircraft 12. The cycle meter counts cycles on the low pressure turbine 34 in a known manner. For instance, a once-per-revolution pulse may be generated by an electromagnetic pickup for each cycle of rotation for a monitored component or system. The examples described in this disclosure are not limited cycle meters mounted in aircraft 12. Other examples include cycle meters mounted in automobiles or on fixed equipment, such as an electric generator.

As known, during a repair or replacement of the low pressure turbine 34, the cycle meter 46 is typically reset to show zero or "000000" cycles on display 48. The cycle meter 46 and display 48 are analog electro-mechanical devices in this example.

Figure 2:
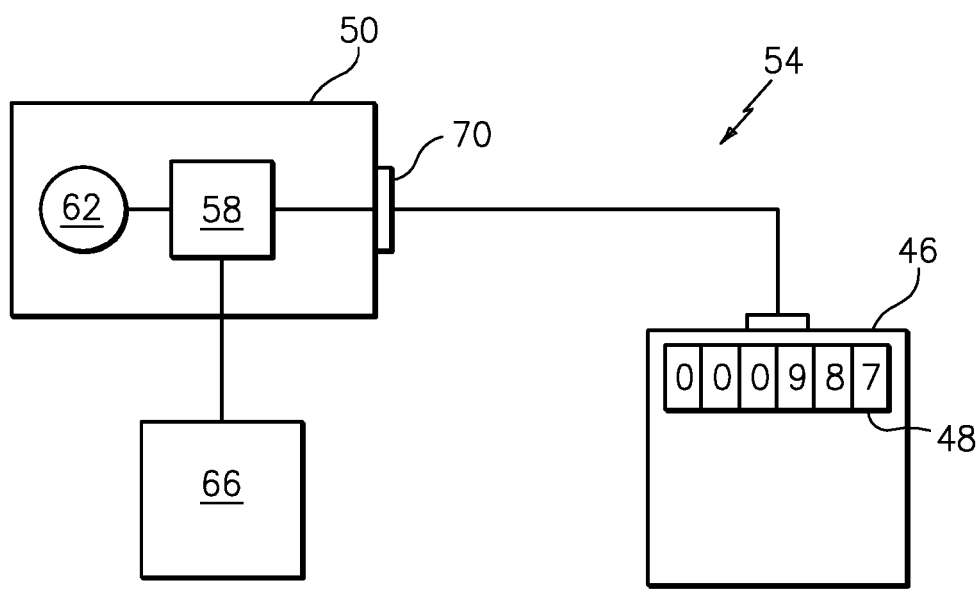
FIG. 2 shows a schematic view of an example cycle meter adjuster connected to a cycle meter.

Referring to FIG. 2, an example cycle meter adjuster 50 communicates voltage pulses along path 54 to the cycle meter 46. The voltage pulses increment the number of cycles displayed on the display 48 of cycle meter 46, simulating pulse waveforms generated on the aircraft 12. The cycle meter adjuster 50 includes display 48 in some examples.

In this example, voltage pulses continue to communicate to the cycle meter 46 until the "000000" is displayed on the display 48 of the cycle meter 46. The cycle meter 46 may be removed from the aircraft 12 during the adjusting procedure. The cycle meter 46 is an electromechanical device that is advanced forward to reach a reset state. Other examples advance the cycle meter 46 to some number other than "000000." Other examples utilize solid-state, rather than electromechanical, cycle meters.

The example cycle meter adjuster 50 includes a circuit module 58 and an adjuster module 62. The circuit module 58 receives a voltage from a power supply 66, such as a battery pack, and generates the voltage pulses that are communicated to the cycle meter 46 along the path 54.

The cycle meter adjuster 50 includes a connection interface 70 that connects the cycle meter adjuster 50 to the path 54 such that the cycle meter adjuster 50 is able to communicate voltage pulses to the cycle meter 46.

In this example, the adjuster module 62 adjusts a frequency of the voltage pulses communicated from the circuit module 58 to the cycle meter 46 along path 54 through the connection interface 70. The example adjuster module 62 is configured to adjust frequencies of the voltage pulses from 0.5 cycles per second to more than 100 cycles per second. Other examples produce a larger range of frequencies and pulse widths. As can be appreciated, increasing the frequency of the voltage pulses communicated to the cycle meter 46 increases the speed at which the cycle meter 46 is adjusted.

Figure 3:
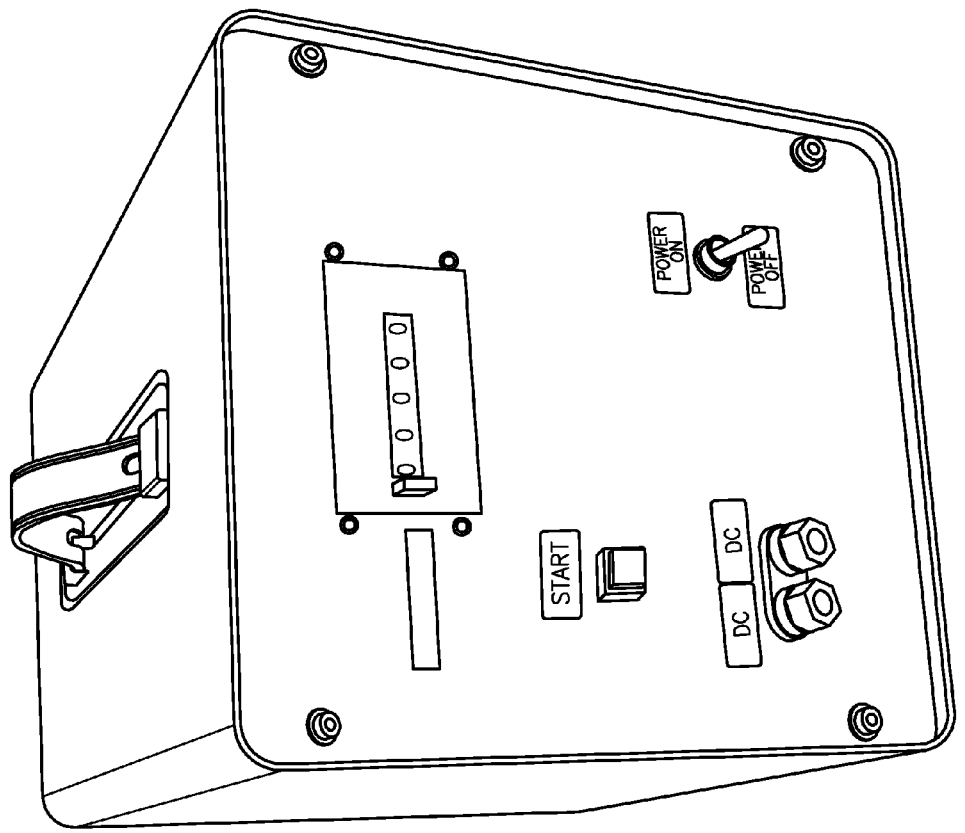
FIG. 3 shows a perspective view of the FIG. 2 cycle meter adjuster.
Figure 3:
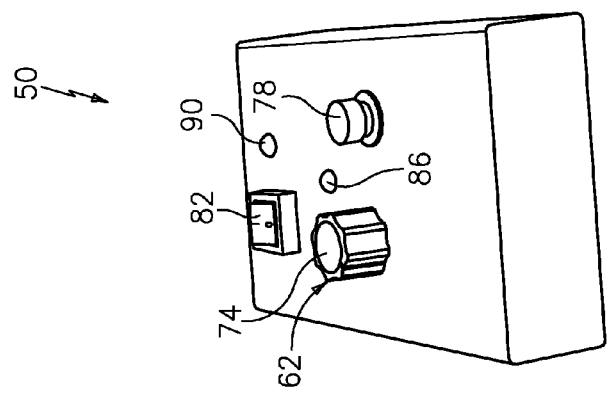

Referring to FIG. 3 with continued reference to FIG. 2, one example of the adjuster module 62 includes an adjuster knob 74, which is a rotatable knob in this example. An operator rotates the adjuster knob 74 clockwise or counter-clockwise to alter the frequency generated by the cycle meter adjuster 50.

In this example, the cycle meter adjuster 50 further includes a manual-advance switch 78. Actuating the manual-advance switch 78 enables a user to communicate a single voltage pulse from the cycle meter adjuster 50 to the cycle meter 46. The single voltage pulse increases the number shown on the display 48 by one.

The example cycle meter adjuster 50 may also include an on/off switch 82, a red Light Emitting Diode (LED) 86, and a green LED 90. The red LED 86 lights up when a pulse is generated by the cycle meter adjuster 50. The green LED 90 lights up when the on/off switch 82 is moved to an on position. In another example, the green LED lights up when power is applied to the cycle meter adjuster 50.

In one example method of using the cycle meter adjuster 50, a user connects the connection interface 70 to the cycle meter 46 using alligator clips or banana connectors, for example. The user then turns the cycle meter adjuster 50 on and rotates the adjuster knob 74 in a clockwise direction to increase the frequency of the voltage pulses produced by the cycle meter adjuster 50. In this example, the user rotates the adjuster knob 74 to a maximum frequency producible by the circuit module 58, which minimizes the delay between the voltage pulses. Example modifications include changing resistors or reprogramming to adjust the maximum frequency.

The user monitors the display 48 as the numbers increase. As the numbers on the display 48 approach "000000," such as "990000," the user rotates the adjuster knob 74 in a counter-clockwise direction to decrease the frequency of the voltage pulses produced by the cycle meter adjuster 50. When the numbers on the display 48 are even closer to "000000," such as "999995," the user rotates the adjuster knob 74 further in the counter-clockwise direction to stop the voltage pulses. The user then actuates the manual-advance switch 78 to increase the number shown on the display 48 until "000000" is displayed.

The cycle meter 46 is then disconnected from the cycle meter adjuster 50 and reinstalled within the aircraft 12. In another example, the cycle meter 46 is adjusted while the cycle meter 46 remains in the aircraft 12.

Figure 4:
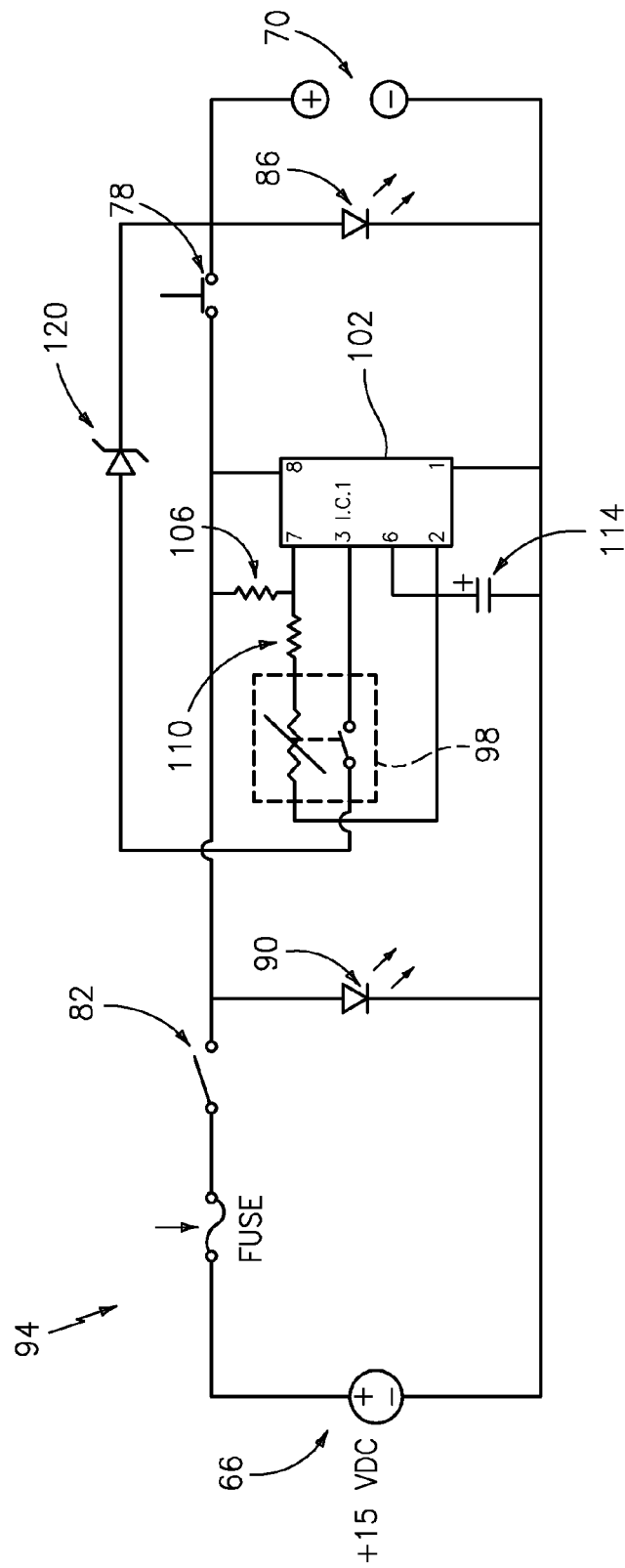
FIG. 4 shows an example circuit for use in the FIG. 2 cycle meter adjuster.

Referring to FIG. 4 with continuing reference to FIGS. 2 and 3, an example circuit 94 suitable for use in the circuit module 58 of the cycle meter adjuster 50 includes a potentiometer 98. The potentiometer 98 can be scaled as appropriate for application specific requirements. In an exemplary embodiment, the potentiometer 98 is a 1 MΩ potentiometer. The potentiometer 98 is operatively linked to an integrated circuit 102. Rotating the adjuster knob 74 adjusts the potentiometer 98 to change the frequency of voltages pulses communicated from the circuit 94. A person having skill in this art would understand how to operatively link the potentiometer 98 and the adjuster knob 74 in this manner.

In one example, the integrated circuit 102 is a timer circuit, such as an LM555 timer, that produces a variable frequency output in response to adjustment of the potentiometer 98. A 1 µf electrolytic capacitor 114 is operatively linked to position 6 of the integrated circuit 102.

Circuit 94 further includes a 1 kΩ, 0.5 W resistor at 106, and a 4.7 kΩ, 0.5 W resistor at 110. A reverse Zener diode 120 is also included within the circuit. While specific values for resistors 106 and 110 as well as capacitor 114 have been provided in this example, alternate values may also be supported within the scope of the invention.

In this example, the connection interface 70 comprises two banana plug sockets. Other examples may include other mechanisms for communicating the voltage pulses between the cycle meter adjuster 50 and the cycle meter 46.

Figure 5:
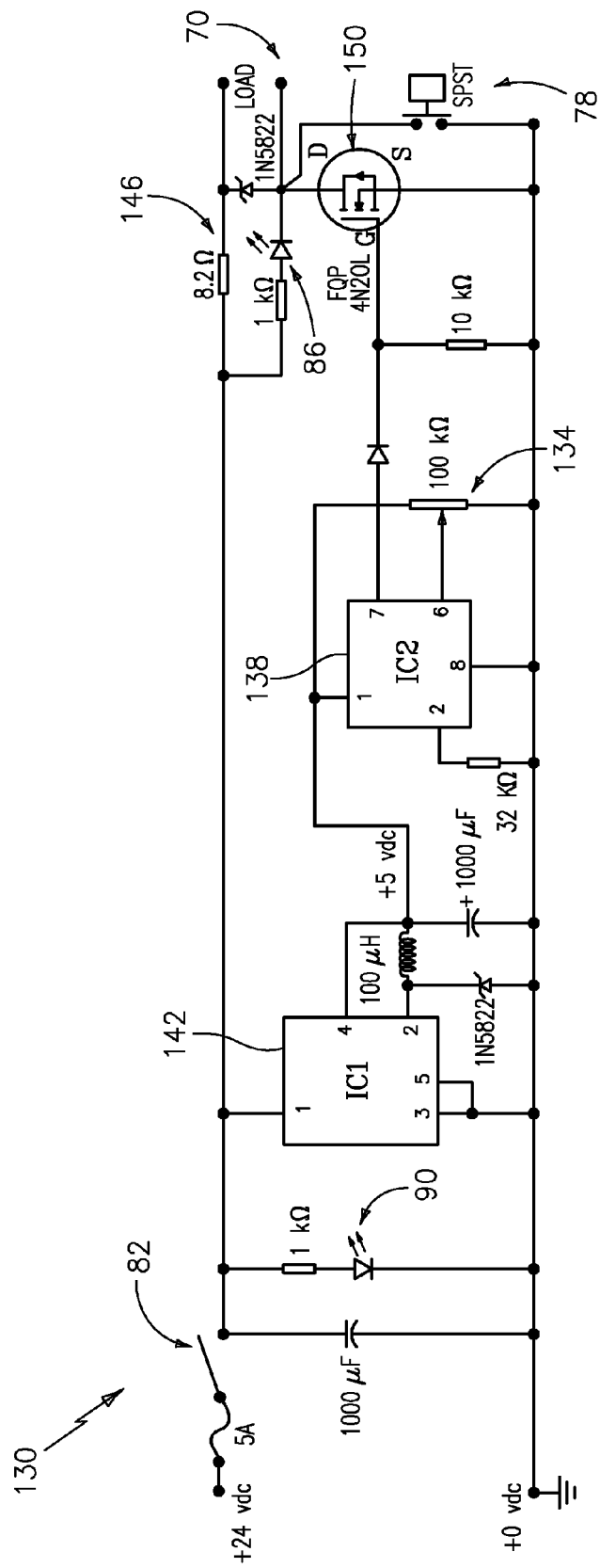
FIG. 5 shows another example circuit for use in the FIG. 2 cycle meter adjuster.

Referring to FIG. 5 with continued reference to FIGS. 2 and 3, another example circuit 130 for use in the circuit module 58 includes a potentiometer 134 operatively linked to pin 6 of a microcontroller 138. In this example, the microcontroller 138 is a PICAXE-08M type microcontroller. In the example circuit 130, the microcontroller 138 acts as a programmable timer circuit that produces a variable frequency output in response to adjustment of the potentiometer 134. The microcontroller 138 may include an internal analog-to-digital converter to determine a digitized value of the voltage at potentiometer 134. In the example circuit 130, position 7 of microcontroller 138 drives a discrete output to control a switching state of switch 150. Switch 150 may be a field effect transistor that enables a lower voltage output of the microcontroller 138 to drive a higher voltage output on connection interface 70.

The example circuit 130 includes a power regulator 142 that, in this example, is an LM2576T-005G type power regulator. The example circuit 130 also includes 1N5822 type Zener diodes.

Notably, the resistors within the circuit 130 are 0.25 W resistors, with the exception of a resistor 146, which is a 1 W resistor. The configuration of the circuit 130 does not require heat sinks in this example.

Pseudo-code for an example program executable on the microcontroller 138 includes the following:

```
symbol potentiometer = m0
main:
    readadc 1, potentiometer
    let potentiometer = potentiometer * 2
    if potentiometer < 6 then
        let potentiometer = 6
    end if
    if potentiometer > 500 then
        goto main
    end if
    high 0
    pause 5
    low 0
    pause potentiometer
    goto main
```

Features of the disclosed examples include a cycle meter adjuster that is adjustable to control the speed at which the cycle meter is adjusted. Another feature of the disclosed examples is a relatively compact cycle meter adjusting device.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A cycle meter adjuster, comprising:
   a circuit configured to provide a plurality of voltage pulses;
   a controller configured to selectively adjust a frequency of the voltage pulses; and
   a connection interface configured to communicate the voltage pulses to a cycle meter.

2. The cycle meter adjuster of claim 1, wherein the circuit comprises a timer circuit.

3. The cycle meter adjuster of claim 2, wherein the timer circuit comprises one of a 555 timer and a microcontroller.

4. The cycle meter adjuster of claim 1, wherein the controller comprises a potentiometer.

5. The cycle meter adjuster of claim 4, including a rotatable knob that is configured to adjust the potentiometer when rotated.

6. The cycle meter adjuster of claim 1, including a manual-advance switch configured to communicate a single voltage pulse from the cycle meter adjuster to the cycle meter in response to manual actuation of the manual-advance switch.

7. The cycle meter adjuster of claim 1, wherein the controller adjusts the frequency of the voltage pulses from 0.5 cycles per second to more than 100 cycles per second.

8. The cycle meter adjuster of claim 1, wherein the connection interface comprises one of alligator clips and a banana connector.

9. The cycle meter adjuster of claim 1, wherein the circuit is connectable to a voltage source.

10. The cycle meter adjuster of claim 1, wherein the cycle meter is an electromechanical device, and each of the voltage pulses communicated to the cycle meter adds a cycle count to the cycle meter.

11. A cycle meter adjusting device, comprising:
    a circuit configured to provide multiple voltage pulses;
    an adjustable potentiometer configured to vary a frequency of the voltage pulses provided by the circuit; and
    a coupling interface configured to selectively communicate the voltage pulses provided by the circuit to a cycle meter having a display, wherein each of the voltage pulses adjusts a number of cycles shown on the display.

12. The cycle meter adjusting device of claim 11, wherein the coupling interface comprises one of an alligator clip and a banana connector.

13. The cycle meter adjusting device of claim 11, including a rotatable knob configured to adjust the adjustable potentiometer.

14. The cycle meter adjusting device of claim 11, including a manual-advance switch configured to communicate a single voltage pulse from the cycle meter adjusting device to the cycle meter in response to manual actuation of the manual-advance switch.

15. The cycle meter adjusting device of claim 11, wherein the cycle meter is an electromechanical device configured to track cycles on an aircraft.

* * * * *